(12) United States Patent
Loder et al.

(10) Patent No.: US 7,076,144 B2
(45) Date of Patent: Jul. 11, 2006

(54) APPARATUS AND METHOD FOR CONTROLLING THE BEND RADIUS OF AN OPTICAL FIBER CABLE

(75) Inventors: Harry A. Loder, Austin, TX (US); Duane T. Smith, Round Rock, TX (US)

(73) Assignee: 3M Innovative Properties Company, St. Paul, MN (US)

(*) Notice: Subject to any disclaimer, the term of this patent is extended or adjusted under 35 U.S.C. 154(b) by 471 days.

(21) Appl. No.: 09/992,212

(22) Filed: Nov. 5, 2001

(65) Prior Publication Data

US 2002/0106162 A1 Aug. 8, 2002

Related U.S. Application Data

(60) Division of application No. 09/643,333, filed on Aug. 22, 2000, which is a continuation-in-part of application No. 09/443,713, filed on Dec. 1, 1999, now Pat. No. 6,419,399.

(51) Int. Cl.
*G02B 6/00* (2006.01)

(52) U.S. Cl. .................. 385/134; 385/128; 385/136; 385/147

(58) Field of Classification Search ............ 385/134, 385/135, 136, 137, 147, 128
See application file for complete search history.

(56) References Cited

U.S. PATENT DOCUMENTS

| | | | |
|---|---|---|---|
| 4,306,760 A | 12/1981 | Testa | 339/103 |
| 4,846,564 A | 7/1989 | Caron | 350/96.2 |
| 4,863,232 A | 9/1989 | Kwa | 350/96.2 |
| 5,123,073 A | 6/1992 | Pimpinella | 385/59 |
| 5,144,391 A | 9/1992 | Iwata et al. | 357/23.7 |
| 5,155,784 A | 10/1992 | Knott | 385/88 |
| 5,155,785 A | 10/1992 | Holland et al. | 385/89 |

(Continued)

FOREIGN PATENT DOCUMENTS

| | | |
|---|---|---|
| DE | 2734522 | 2/1979 |
| EP | 0 399 766 A2 | 5/1990 |
| EP | 0485 196 A2 | 5/1992 |
| EP | 0 516 337 B1 | 7/1997 |
| EP | 0 788 002 A1 | 8/1997 |
| EP | 0 929 199 A1 | 7/1999 |
| EP | 0 949 522 A2 | 10/1999 |
| WO | WO98/59271 | 12/1998 |
| WO | WO 00/16145 | 3/2000 |

OTHER PUBLICATIONS

Frederic H. Abendschein, et al., "Recent Advances in Fiber–Optic Backplane Connectors", IEEE, 1998 Electronic Components and Technology Conference, pp. 790–793.

L. Melchlor, et al., "A High Density Optical Backplane Connector", IEEE, 1996 Electronic Components and Technology Conference, pp. 453–455.

Frederic H. Abendschein, et al., "Recent Advances in Fiber–Optic Backplane Connectors", IEEE, 1998 Electronic Components and Technology Conference, pp. 790–793.

I. Melchlor, et al., "A High Density Optical Backplane Connector", IEEE, 1996, Electronic Components and Technology Conference, pp. 453–455.

Iwano, et al., "Compact and Self–Retentive Multi–Ferrule Optical Backplane Connector", Journal of Lightwave Technology, Oct. 1992, No. 10, pp. 1356–1362.

*Primary Examiner*—Sung Pak
(74) *Attorney, Agent, or Firm*—Yen Tong Florczak

(57) ABSTRACT

A bend radius control member for controlling the bend radius of an optical fiber cable including a deformation resistant heat shrunk outer jacket wrapped around the optical fiber cable. The heat shrunk outer jacket has a desired bend radius curvature.

5 Claims, 14 Drawing Sheets

U.S. PATENT DOCUMENTS

| | | | | |
|---|---|---|---|---|
| 5,182,785 A | * | 1/1993 | Savegh et al. | 385/128 |
| 5,204,925 A | | 4/1993 | Bonanni et al. | 385/89 |
| 5,216,732 A | | 6/1993 | Knott | 385/59 |
| 5,347,603 A | * | 9/1994 | Belenkiy et al. | 385/76 |
| 5,473,723 A | * | 12/1995 | Stockman et al. | 385/100 |
| 5,640,476 A | * | 6/1997 | Womack et al. | 385/76 |
| 5,710,851 A | * | 1/1998 | Walter et al. | 385/100 |
| 5,774,615 A | * | 6/1998 | Uda et al. | 385/128 |
| 5,793,919 A | | 8/1998 | Payne et al. | 385/135 |
| 5,796,896 A | | 8/1998 | Lee | 385/59 |
| 5,809,191 A | | 9/1998 | Stevens et al. | 385/59 |
| 5,894,536 A | * | 4/1999 | Rifkin et al. | 385/99 |
| 5,960,138 A | | 9/1999 | Shimoji et al. | 385/58 |
| 6,134,370 A | * | 10/2000 | Childers et al. | 174/74 R |
| 6,186,670 B1 | | 2/2001 | Austin et al. | 385/55 |
| 6,263,144 B1 | * | 7/2001 | Daoud | 385/134 |

* cited by examiner

APPARATUS AND METHOD FOR CONTROLLING THE BEND RADIUS OF AN OPTICAL FIBER CABLE

RELATED APPLICATIONS

The present application is a Divisional of commonly-owned U.S. patent application Ser. No. 09/643,333, filed Aug. 22, 2000, which is a continuation-in-part of U.S. patent application Ser. No. 09/443,713, filed Dec. 1, 1999 now U.S. Pat. No. 6,419,399, and which are hereby incorporated by reference.

BACKGROUND OF THE INVENTION

The present invention relates to an optical fiber connector system. More particularly, the present invention relates to a connector assembly for optically coupling a circuit card to a backplane.

The use of optical fibers for high-volume high-speed communication is well established. As the volume of transmitted information grows, the use of optical fiber cables including multiple optical fibers, and of systems using multiple optical fiber cables, has increased.

It has long been desirable to increase the number of fibers that can be removably connected within a given space. Until recently fiber optic interconnects were limited to single or duplex formats utilizing industry standard connectors, such as the SC, ST, LC, and the like. These solutions are analogous to single end electrical cable terminations prevalent prior to the invention of electrical ribbon cable and mass-terminable IDC connectors.

Fiber optic terminations currently are evolving from single terminations to mass terminations. Within the past few years, ribbonized multi fiber cables have been developed. In conjunction with these cable development efforts, multi-fiber mounting ferrules also have been developed.

The design of traditional electronic cabinets is now being utilized to accommodate optical and opto-electronic devices. In traditional cabinet designs, the cabinet comprises a box having a plurality of internal slots or racks, generally parallel to each other.

Components are mounted on planar substrates, called as circuit boards or daughter cards, which are designed to slide into the slots or racks within the cabinet.

As with electrical cables, the need exists to provide a means to allow the fiber signals to be passed through the backplane of electronic cabinets. A backplane derives its name from the back (distal) plane in a parallelepipedal cabinet and generally is orthogonal to the board cards. The term backplane in the present invention refers to an interconnection plane where a multiplicity of interconnections may be made, such as with a common bus or other external devices. For explanation purposes, a backplane is described as having a front or interior face and a back or exterior face.

An example of a backplane connectivity application is the interconnection of telephone switching equipment. In this application, cards having optical and electronic telecommunication components are slid into cabinets. The need exists to have a removable fiber termination from both the front side and the back-side of the backplane.

Furthermore, as a function of inserting and removing an optical driver card from a rack coupled to the backplane, coupling and uncoupling of the optical connections in the card is to be completed in a blind mating manner.

In order to maintain appropriate transmission of light signals, optical fiber ends are to be carefully aligned along all three movement (x, y, and z) axes, as well as angularly. Alignment challenges increase and tolerances decrease geometrically as the number of optical fibers to be aligned increases. Blind mating of a card-mounted component to a backplane connector has been found to create special challenges with regards to alignment and mating force issues along the axis of interconnection.

For the purposes of the present description, the axis of interconnection is called the longitudinal or x-axis and is defined by the longitudinal alignment of the optical fibers at the point of connection. Generally, in backplane applications, the longitudinal axis is collinear with the axis of movement of the cards and the axis of connection of the optical fibers in and out of the cabinets. The lateral or y-axis is defined by the perpendicular to the x-axis and the planar surface of the card. Finally, the transverse or z-axis is defined by the orthogonal to the x-axis and the backplane surface. The angular alignment is defined as the angular orientation of the card with respect to the x-axis.

In preferred embodiments, the motion of sliding the card into a receiving slot simultaneously achieves optical interconnection. The "optical gap" distance along the longitudinal axis between the optical fiber ends and interconnected optical components is an important consideration. A large gap will prevent effective connection, thereby causing the loss of the optical signals. On the other hand, excessive pressure on the mating faces, such as that caused by "jamming in" a card, may result in damage to the fragile optical fiber ends and mating components. Traditional optical gap tolerances are in the order of less than one micron.

Current connector assemblies include forward biased spring mounted ferrules. The purpose of the said bias springs is twofold, one, to absorb a limited amount of over travel of the ferrules during mating and two, to provide a predetermined spring biasing force thus urging the ferrules intimately together when the ferrules are in their mated position.

An additional subject of concern is card gap, especially when dealing with backplane connector systems. Card gap is defined as the space remaining between the rear edge of a circuit card and the interior or front face of the backplane. In general, designers and users of backplane connection systems find it exceedingly difficult to control the position of a circuit card to a backplane within the precision range required for optical interconnects. Card gap, otherwise defined as card insertion distance, is subject to a multiplicity of variables. Among these variables are card length, component position on the surface of the card, card latch tolerances, and component position on the backplane.

Over insertion of a circuit card relative to the interior surface of a backplane presents a separate set of conditions wherein the backplane connector's components are subjected to excessive compressive stress when fixed in a mated condition. In certain instances the said compressive stress may be sufficient to cause physical damage to the connector's components and the optical fibers contained therein.

The need remains for a connector system that prevents component damage due to excessive operator force, compensates for longitudinal card misalignment, yet provides accurate control of optical gap distance and mating force.

Another consideration is radial misalignment of the card. When an operator inserts a card on a slot, it is often difficult to maintain the card edge perfectly aligned in parallel with the lateral axis of the backplane. FIG. 1 illustrates an angularity misaligned card 10 having a connector 12 mating to a backplane connector 14. The card is otherwise correctly aligned along the y and z-axes. At the point of contact between connectors 12 and 14, the angular misalignment prevents correct gap spacing between optical fibers 16 and causes undue pressure on one end of the connector and the respective optical fiber end faces.

Other considerations exist in backplane interconnection systems other than correct alignment. With the advent of laser optical signals and other high-intensity light sources, eye safety is a major concern associated with backplane connector users today. The safety issues are further escalated by the fact that ribbonized fiber arrays present a greater danger than the single fiber predecessors because the amount of light is multiplied by the number of fibers.

Previous systems, such as that discussed in U.S. Pat. No. 5,080,461, discuss the use of complex door systems mounted on terminating fiber connectors, but mainly for the purpose of preventing damage or contamination of fiber ends. As the lighttransmitting core of a single mode fiber measures only ~8 microns in diameter, even a minute accumulation of dust particles may render the fiber inoperable. However, prior systems require complex terminations at each fiber end and only may be mated to another corresponding male-female connector pair, not to standard connectors, making their use cumbersome.

EMI (electromagnetic interference) control also has arisen as an issue in backplane connector design. As connection of optoelectronic devices through a backplane often necessitates forming of a physical opening through the backplane of an electronic cabinet, the potential exists for EMI leakage through the said backplane. Electrical interconnection has attempted to address this problem through the use of several elaborate EMI shielding techniques. However, current optical fiber connectors have failed to satisfy this concern.

Finally, another concern regarding backplane optical connector applications is bend radius control. Horizontal cabinets connections are often subject to bend stresses due to gravity, operator misuse, or physical constraints, such as when a cabinet is pressed against a wall. Optical fibers are made of glass and rely on total internal reflection to transmit light signals. When an optical fiber is bent beyond a certain critical angle, fractures may appear in the glass, causing the fiber to break or become damaged. Also, at certain bend angles, even if the glass fiber does not break, the optical signal may be lost or may deteriorate, as the complete light signal is no longer contained inside the fiber.

Several methods and apparatus for controlling the bend radius of an optical cable have been attempted. Among those are preformed boots that are slid over the cable, external devices such as clips or clamps, and elaborate injection molded components that are shaped such that when attached to a cable, the cable assumes the shape of the molded structure.

Since backplane connection frequently involves connecting an increasing number of optical fibers in a small space, the need exists for an apparatus for controlling the bend radius of the optical fibers.

SUMMARY OF THE INVENTION

The present invention relates to an optical fiber interconnect system that provides longitudinal and angular alignment control, contamination control, visual safety and bend radius control. In certain embodiments, the optical interconnect system of the present invention provides for interconnecting arrays of optical fiber cables in a individual or collective fashion.

The fiber optic connector system of the present invention is designed for connecting at least one optical fiber cable mounted near the edge of a planar substrate, a card, through a backplane. Each optical fiber cable includes a plurality of optical fibers and a terminating ferrule, the longitudinal orientation of the optical fibers within the terminating ferrule defining a longitudinal axis and a forward direction towards the backplane. Each optical fiber cable is terminated by a ferrule having a first longitudinal range of motion $x_1$ with respect to a retaining member and a ferrule spring element having a longitudinal ferrule spring force $f_n$.

The optical connector system comprises a card housing assembly and a backplane housing assembly. The card housing assembly is mounted on the planar substrate or card and includes at least one ferrule-receiving cavity for receiving the optical fiber ferrule. The card housing assembly includes a card housing spring. The card housing assembly has a longitudinal range of motion $x_2$ with respect to the card, the card housing assembly spring controlling movement of the card housing assembly along the longitudinal range of motion. The card spring has a longitudinally directed spring force h, wherein $$h > \sum_{1}^{n} f_n,$$

that is, the spring force of the card spring can counteract the opposite spring force of all the ferrule springs. It should be understood that the ferrule spring may comprise one or more individual spring elements. In one embodiment of the present invention, the card spring includes two or more springs laterally spaced from in each other, to create an independent card suspension that compensates for angular misalignment along the x-y plane.

The backplane member has a first surface and a second surface. The backplane housing include at least one longitudinal receiving cavity, matching a respective cavity in the card housing assembly. The receiving cavity has a frontal opening along the first surface of the backplane member and a rear opening along the second surface of the backplane member. A frontal door covers the frontal opening and a rear door covers the rear opening. In a particular embodiment, the doors are spring elements made of a flexible, conductive material and biased towards a closed position. To provide EMI protection, the doors may be electrically connected to ground. In another particular embodiment, the backplane housing comprises two members, one coupling to the first side of the backplane and the second coupling to the second side of the backplane. To provide EMI protection, one of the members may include an electrically conductive material electrically connected to ground.

The interconnect system also may include one or more optical cables including a bend radius control member for controlling the bend radius of an optical fiber cable. The bend radius control member comprises a deformation resistant heat-shrinked outer jacket wrapped around the optical fiber cable, wherein the heat-shrunk outer jacket has a desired bend radius curvature.

DETAILED DESCRIPTION OF THE INVENTION

Figure 1:
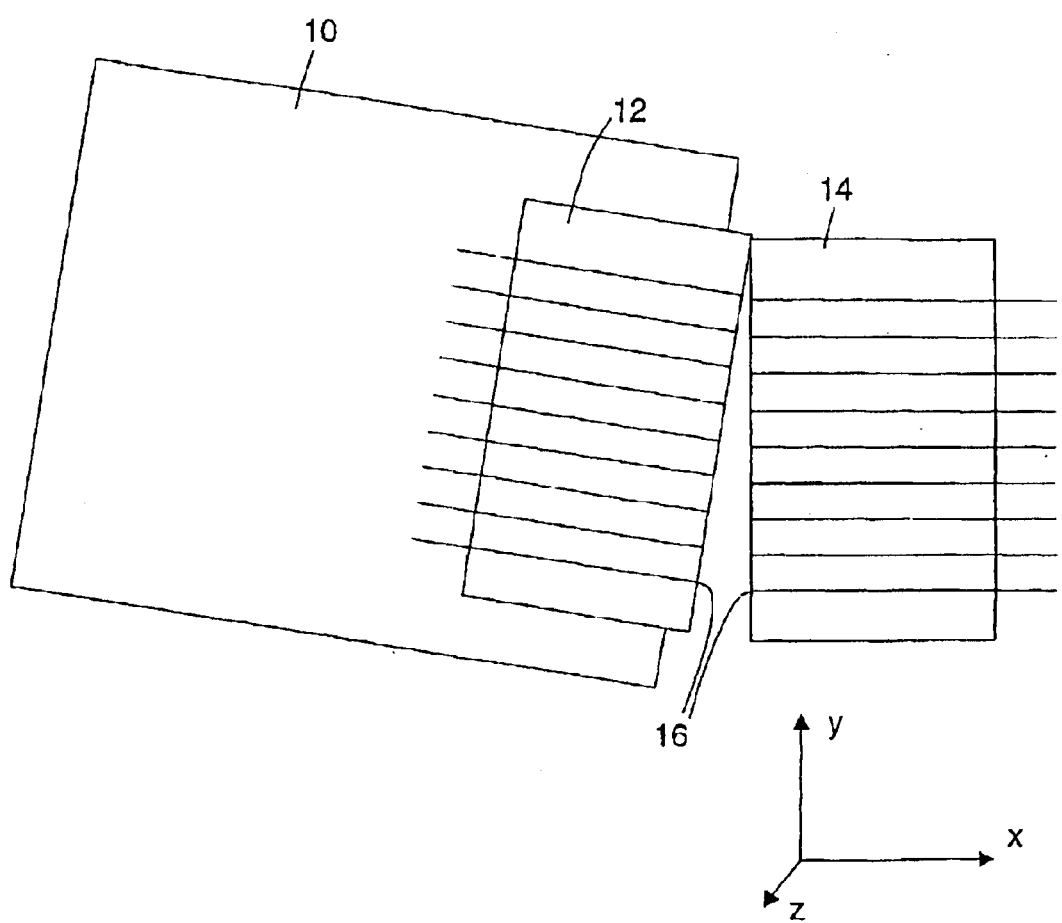
FIG. 1 is a side elevation view of an angularly misaligned card and a backplane connector.
Figure 2:
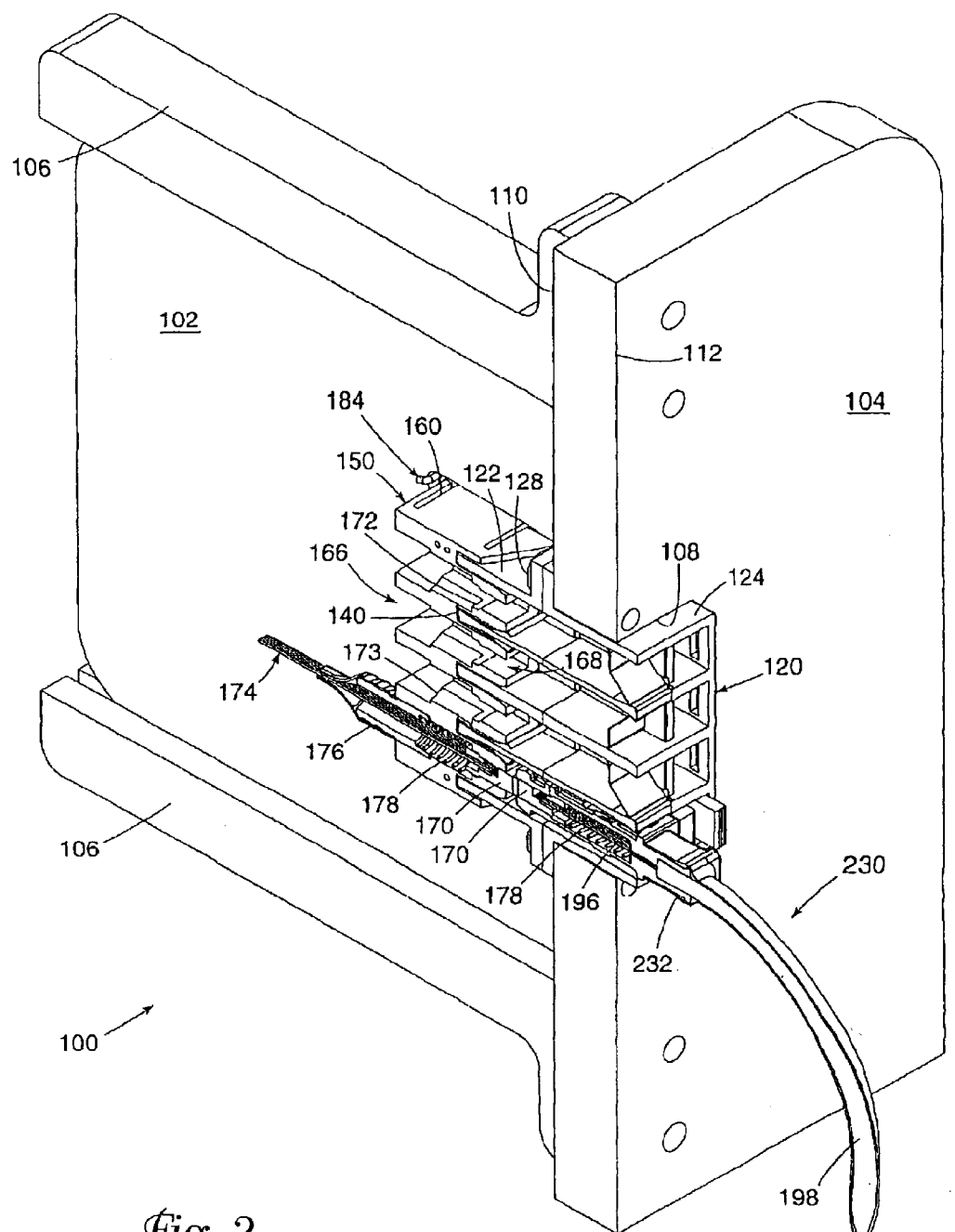
FIG. 2 is an isometric cut-away view of a first embodiment of a connector system in accordance with the present invention in a coupled card position.
Figure 3:
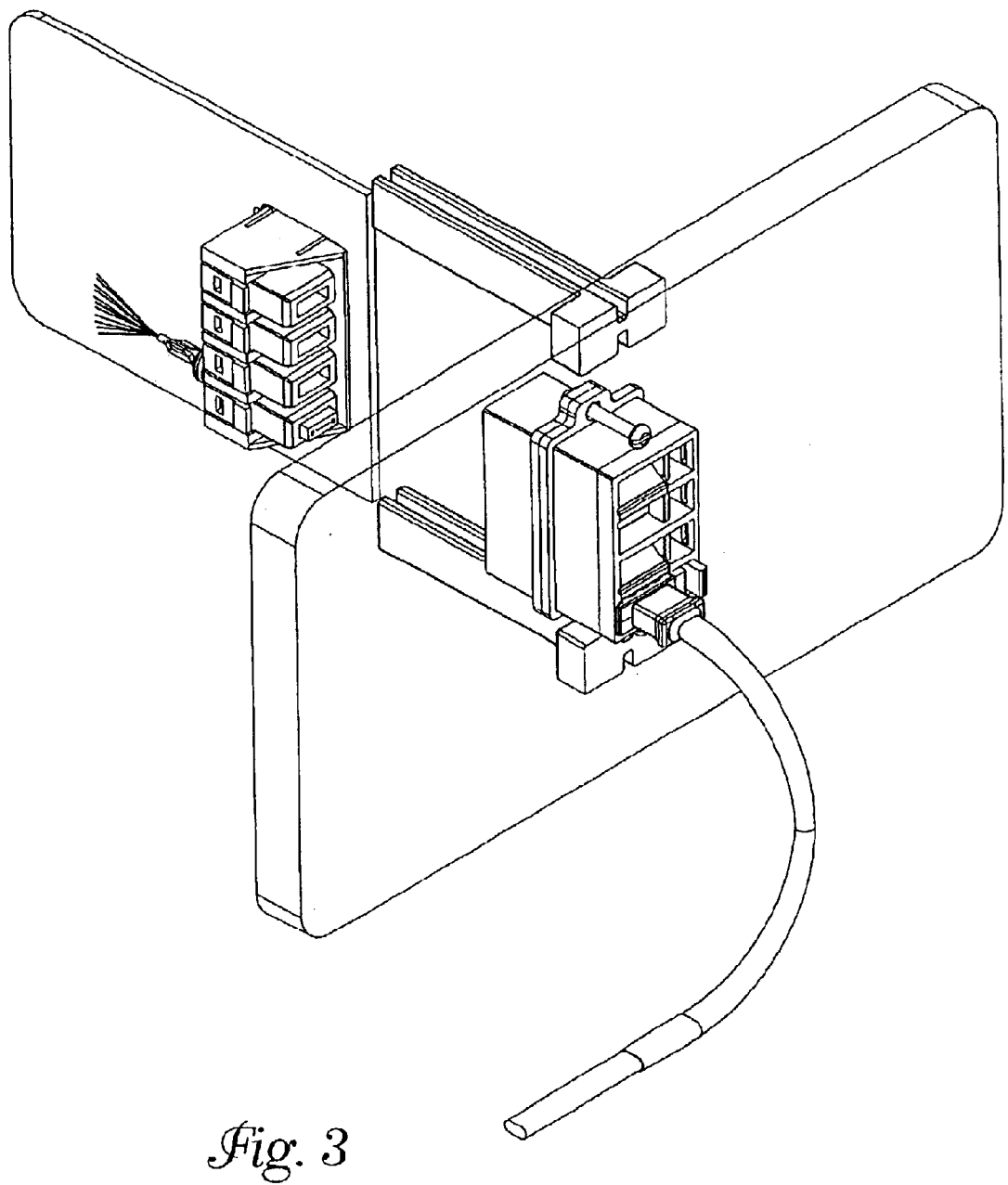
FIG. 3 is an isometric view of the connector system illustrated in FIG. 2 in an uncoupled card position.
Figure 4:
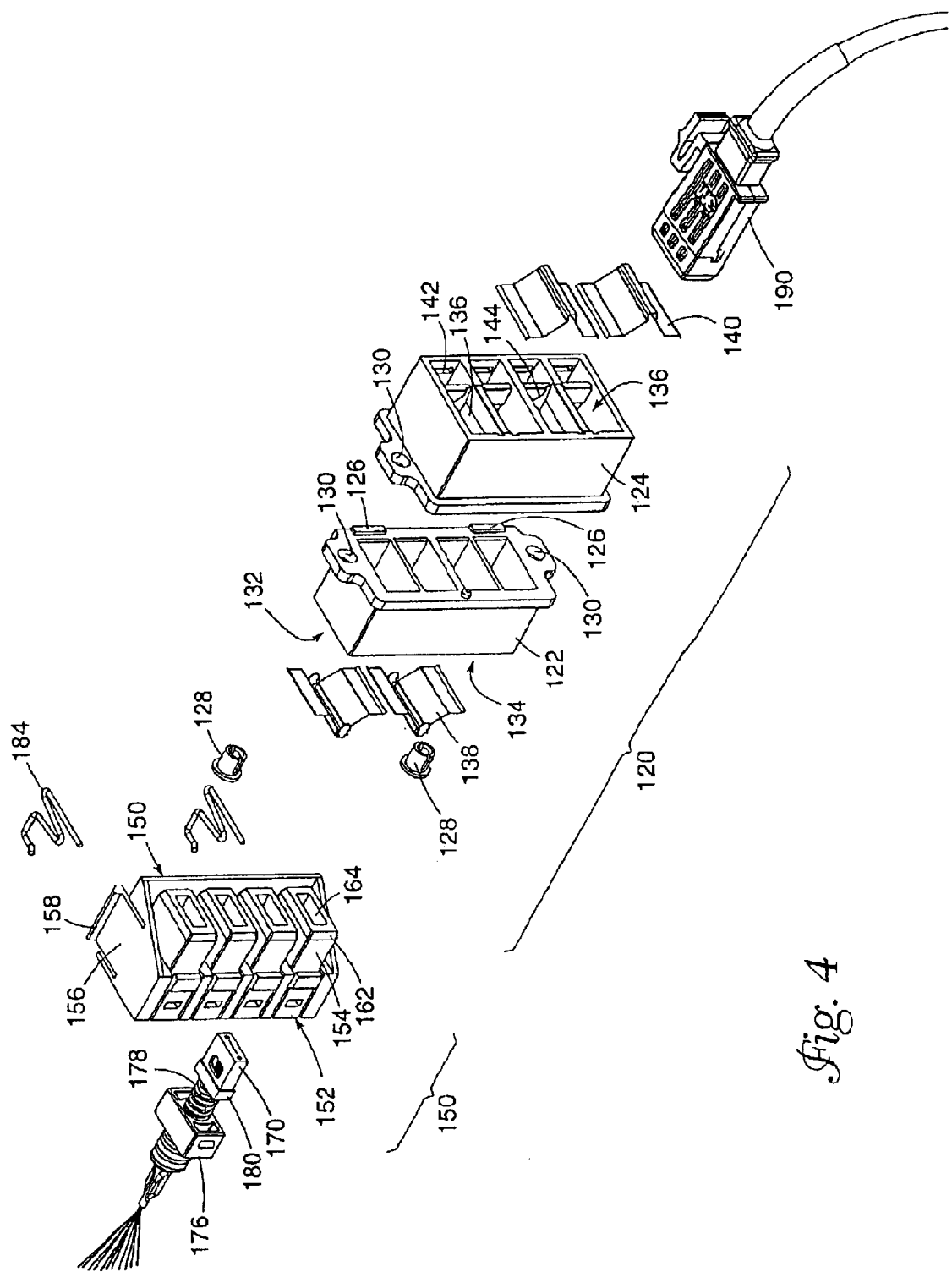
FIG. 4 is an exploded isometric view of the connector system illustrated in FIG. 2.

FIGS. 2 and 3 illustrate an embodiment of an optical interconnect system 100 in accordance with the present invention. The optical interconnect system 100 couples a circuit card or daughter card 102 with and through a backplane 104. The card 102 is a planar substrate, such as a circuit card or daughterboard, which may include optical, optoelectronic, and electronic components. The card 102 may be slideably inserted in a slot defined by card guides 106. The backplane 104 includes a through opening 108, a first interior surface 110 and a second, exterior surface 112.

The optical interconnect system 100 includes a backplane housing 120 disposed within opening 108. The backplane housing 120 includes, in the present embodiment, a first portion 122 and a second portion 124. The first portion 122 includes male locating features 126 that engage with corresponding female features (not shown) on a rear face of the second portion 124. Locating features three help ensure accurate alignment between the backplane housing portions 122 and 124 during assembly. It should be understood that in alternative embodiments housing portions 122 and 124 do not need to be separate and could be molded as one piece. Splitting off the housing portions 122 and 124, however, may allow for more freedom in mold core design.

In the present embodiment, fasteners 128 secure the backplane housing assembly 120 to the backplane 104. Fasteners 128 include threaded metal inserts inserted through matching bores 130 in the first and second portion 122 and 124 of the backplane housing 120. Those skilled in the art will readily appreciate that mounting screws are used in conjunction with fasteners 128 and that a variety of fastening mechanisms, adhesives, interference fitting, and other devices known in the art may be used to align and secure the backplane housing assembly 120.

The backplane housing assembly 120 defines an array of four receiving cavities 132. Alternative embodiments may include a single receiving cavity or any other necessary number of cavities to accommodate various optical fiber cable connections. Each one of the cavities 132 includes a front opening 134 and a rear opening 136. For the purpose of the description of the present invention the terms rear, front, forward or backward are merely illustrative to help describe the depicted embodiments with respect to the figures. The folding front doors 138 are coupled to close the front opening 134 and rear doors 140 are coupled to close rear openings 136. The front and rear doors 138 and 140 in the present embodiment include flat spring metal members hingedly coupled to the front and rear openings 134 and 136. The doors 138 and 140 are designed to fold down flat when a plug is inserted into the opening of the receiving cavity 132. In the present embodiment, the backplane housing assembly 120 comprises molded plastic pieces of a dielectric material that exhibit the structural strength and dimensional stability required to maintain control of the optical fiber's position. Such materials include, but are not limited to, thermoplastic injection moldable polymers that are filled or unfilled with reinforcement agents, and transfer moldable polymers such as epoxy. The doors 138 and 140 are made of a conductive metal material, such as tempered stainless steel, beryllium/copper alloys or other materials, and are coupled to provide a grounding electrical path. The doors 138 and 140 provide three functions:

1) to provide a physical barrier to limit ambient contamination from entering the assembled connector housing, 2.) to absorb and route to ground electric magnetic interference that may otherwise leak through the cavities 132 through the backplane 104; and 3) to provide eye safety from emitted light signals from either end of the backplane.

The backplane housing assembly 120 may include mating features corresponding to common plugs or ferrules. The dual door design allows for the sealing of the optical connection without the need to include special gated terminations at each connector. The double door arrangement also allows for at least one door to be closed any time a receiving cavity is not filled by both a rear and a front plug. Finally, the use of conductive metal doors retained in a conductive housing assembly 24 allows for the containment and grounding of EMI components, using a relatively simple and elegant design. In embodiments where the user is not concerned with any of the above issues, the use of doors may be optional without effecting the performance and function of the backplane housing assembly 120.

Another useful feature of the housing assembly 120 is the use of side latch receiving features 142. While traditional plug retaining features, such as that in a conventional phone plug, are placed on top of a connector plug and receiving housing, it was found that such an arrangement unnecessarily interfered with the stacking of ribbon flat optical fiber cables. The present invention addresses this problem by placing the latch receiving features along the same plane defined by the optical fiber array in an optical fiber ribbon cable. This allows for vertical stacking of a number of flat ribbon cables in a reduced space.

The front end of the backplane housing assembly 120 mates with a board housing assembly 150 when the card 102 is slid into the guide slots 106. The board housing assembly includes a housing member 152, including hollow protrusions 154 shaped in size to correspond and fit into front openings 134 of the backplane housing assembly 120. The board housing assembly 150 includes board attachment features 156 having a barbed end 158. The board attachment features 156 are designed to be inserted through a receiving slot 160 in the planar substrate 102. While the board attachment features 156 secures the board housing assembly to the board in the transverse and lateral direction, a range of freedom of movement along the longitudinal axis is allowed. The present embodiment, the length of the slot 160 exceeds the width of the alignment feature 156. Those skilled in the art will be readily aware of additional methods for attaching the board housing assembly 150 to the planar substrate 102, while allowing freedom of movement in the x direction. Alternative embodiments may include attachment means such as mechanical fasteners, spring clips or the like.

The protrusions 154 in the present embodiment are hollow and rectangular shaped and are terminated in a truncated pyramid shaped lead 162. The pyramid shaped lead 162 allow for compensation of certain mating misalignments by directing the board housing assembly protrusions 154 into the receiving cavities 132 of the backplane housing assembly. Furthermore, the protrusions 154 are shaped to provide alignment with respect to the inside walls of receiving cavities 132. Protrusions 154 also provide an automatic pressure for opening front doors 138 during mating. The inner walls of protrusion 154 define a stepped cavity 164 that provides guidance to a fiber optic ferrule 170 to be seated inside of the stepped cavity 164. The present embodiment, the stepped cavity 164, is shaped to receive an industry standard ferrule, such as the MT-Style optical ferrules. Step cavity 164 is designed in such a manner that it comprises a front and a rear rectangular opening 166 and 168, respectively. The front opening 166 is sized to allow insertion of the ferrule 170 up to an internal flange 172. A typical MT-style connector includes a ferrule 170 mounted on a stalk of optical fibers 174, slidably connected to a détente body portion 176. The ferrule 170 has a limited range of motion $x_1$ along the longitudinal axis. The stalk of optical fibers 174 is allowed to move with respect to the détente body portion 176. A spring element located between the ferrule and the détente body portion forward biases the ferrule towards a forward end of the range of motion.

In the present embodiment, the board housing assembly 150 includes rear openings 168 designed to accept the MT connector, including the détente body portion 176. The détente body portion 176 is retained against flange 173 while the ferrule 170 is allowed to extend inside of protrusion 154 up to and through the rear opening 168. The détente member 176 is designed in such a manner that as the member 176 is inserted into the front of the stepped cavity 164, the spring 178 is compressed between détente member 176 and the ferrule 170. The ferrule 170 is prevented from travelling freely through the rear opening 168 by a flange 180 formed in the ferrule 170. The flange 180 is formed to act as a travel stop for the ferrule 170 when flange 180 is engaged with internal flange 172. The détente member 176 is provided with a latch feature that engages the rear opening 168 of the board housing assembly 150. Preferably, latching features are provided on both side surfaces of the housing assembly 150 and the détente member 176. It may be desirable in some instances to remove détente member 176 from the housing assembly, and for these situations, a release feature is provided in the side of the housing. This release feature is cantilevered and allowed to pivot and thereby allowing the release feature to be sprung outwards to release the corresponding latch feature.

The length of travel of the card 102 along the card guides 106 is selected such that when in the coupled position the board housing assembly 150 exerts spring force on the backplane housing assembly 120. In a preferred embodiment, the width of the card gap should be greater than 0, preferably greater than the combined travel of the spring biased ferrules (typically 1 to 2 mm) relative to their respective housings.

The range of motion $x_2$ of the board housing assembly 150 with respect to the card 102 is sufficient to correct for tolerance errors in the range of movement of the card 102 along the card guides 106, and to absorb any excessive force imparted by the user when sliding the card before the card is stopped by the backplane housing 120 or by the stop features if present in the card guides 106. The present invention addresses issues or overcompression by allowing the circuit card's attached connector components to move relative to the said circuit card. Accordingly, in the coupled position, the board housing assembly 150 is held tightly against the back of the backplane housing assembly 120 and is subject to a constant spring bias provided by spring assembly 184. The advantage of providing the constant spring bias is to ensure that intimate contact is maintained between the housing assemblies 150 and 120 even in the event that the card 102 is subject to movement during its operation.

Figure 5:
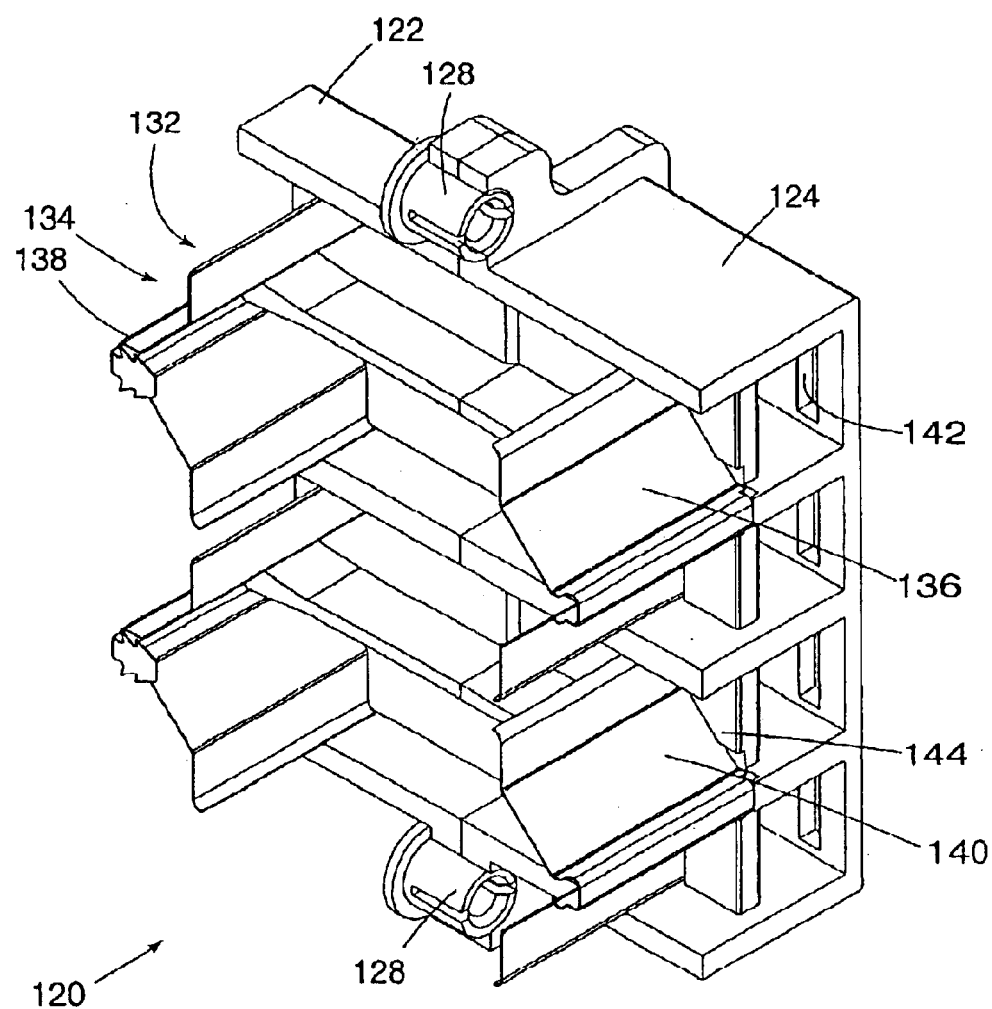
FIG. 5 is an isometric cut-away view of the backplane housing assembly of the connector system illustrated in FIG. 2.

FIG. 5 illustrates a detailed cutaway view of backplane housing assembly 120 having front and rear doors 138 and 140. The doors 138 are designed such that when the protrusions 154 of board housing assembly 150 are inserted into the front opening 134, the pyramid shaped lead 162 of the protrusions 154 forces the front door 138 to fold down. Similarly, when a plug 190 is inserted into rear opening 136, the insertion of the plug 190 causes rear door 140 to fold down. Doors 138 and 140 are preferably formed of a spring-like material that withstands numerous cycles of being folded to an open position and then returning to a closed position when the plug 190 or protrusion 154 is removed. In instances where EMI protection is a concern, the rear doors 140 and the first portion 124 of the backplane housing may be constructed of a conductive material such as metal. When made of a conductive material, the rear door 140 and the first portion 124 will absorb the majority of any EMI radiation that would otherwise escape through the cavities 132. The first portion 124 is then electrically coupled to a ground end feature. In alternative embodiment, either the doors 140 or the first portion of the backplane housing 122 may be constructed of a dielectric material, leaving only one conductive element. The remaining conductive portion would then be coupled to ground.

By providing both a front door 138 and a rear door 140 covering both the front opening 134 and the rear opening 136, the removal of either plug 190 or the card housing assembly 150 results in the closing of one of the doors, thus alleviating any possible visual safety risk. It should be understood that each door is allowed to function independently of the other. Accordingly, that means that if only one plug 190 is inserted into the rear opening 136, the rear doors 140 of the remaining receiving cavities 132 will remain closed. To further assure the tight fit of the doors 138 and 140 within the openings 134 and 136, frame features 144 may be formed on the side walls of the receiving cavities 132 that match the side profile and overlap the side edges of doors 138 and 140. This further creates a tighter seal to prevent contamination, contain EMI, and prevent light leakage.

Figure 6:
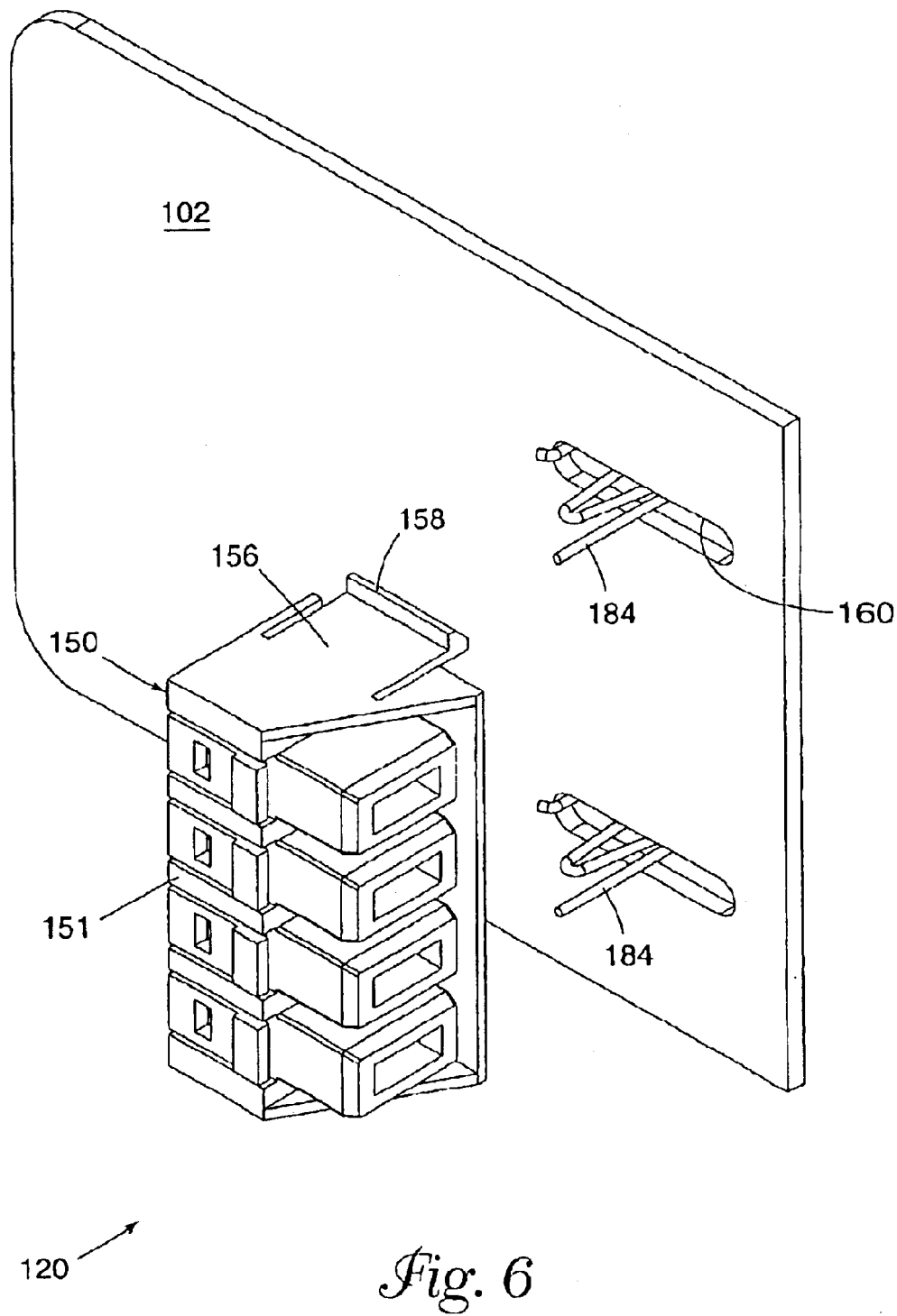
FIG. 6 is an isometric view of the card housing assembly of the connector system illustrated in FIG. 2.
Figure 7:
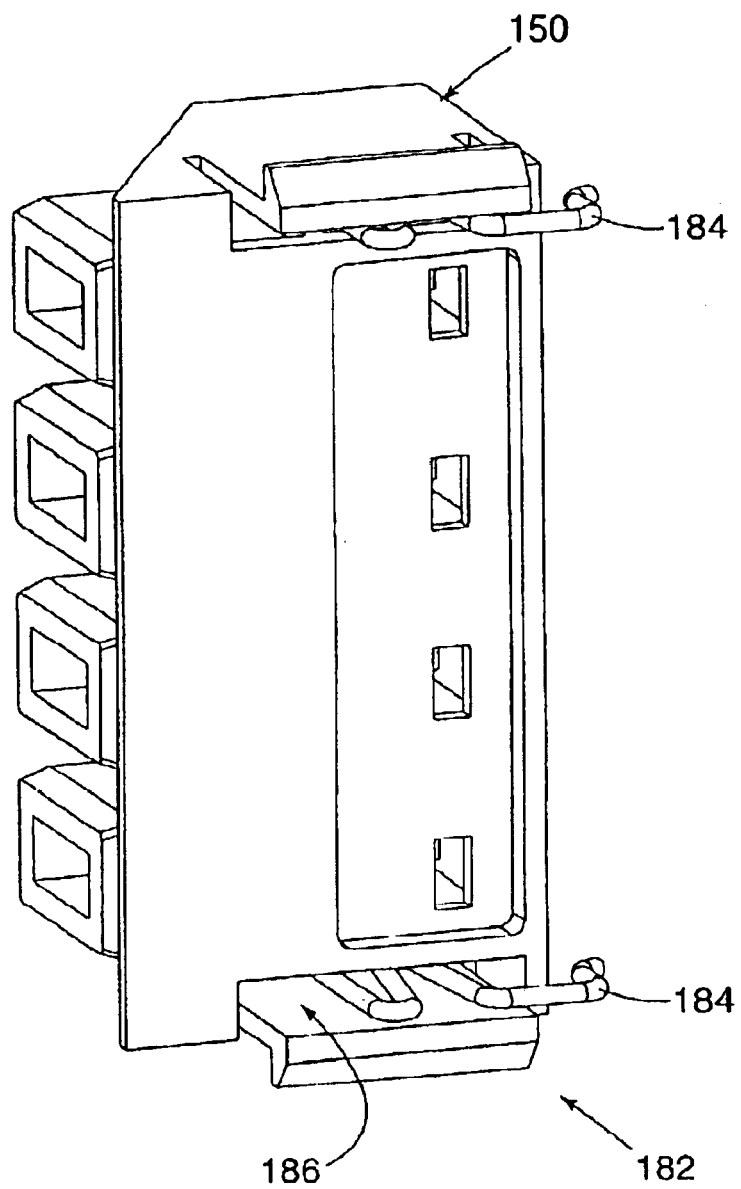
FIG. 7 is an isometric view of the card-facing face of the housing assembly of the connector system illustrated in FIG. 2.

FIGS. 6 and 7 illustrate the positioning of springs 184 inserted into spring receiving openings 186 and housing assembly 150. Springs 184 are wire springs having a wire diameter sized such that the wire springs 184 provide a slight pressed fit between the spring, board attachment features 156 and the receiving boards slots 160. With springs 184 inserted into the spring receiving openings 186, the board attachment features 156 are prevented from flexing, thereby locking the housing assembly 150 to the card 102. Referring in particular to FIG. 6, one may appreciate how slots 160 provide passage through card 102 for the board attachment features 156. The barbed end 158 of the board attachment features 156 is designed as to grip the back side of card 102 thereby securing the housing assembly 150 along the transversed axis to the daughtercard 102. The slots 160 are sized such that the board housing assembly 150 has a range of movement $x_2$ along the longitudinal axis on the surface of the card 102. The combination of the forward bias of the spring assembly 182 and the freedom of movement $x_2$ of the housing assembly 150 allows to compensate for incorrect tolerances in the alignment of the card 102 with respect to the backplane 104. The combined force of the springs 184 of spring assembly 182 is selected to be greater than the summation of all opposing spring forces such as those of the independent springs 178 of the individual ferrule assemblies. Otherwise, the combined force of the springs 178 of the ferrule assemblies would push the housing assembly backwards thus preventing the desired coupling between the board housing assembly 150 and the backplane housing assembly 120. However, as the forward movement of the board housing assembly 150 will be limited by flange 151, the independent ferrules still retain their range of movement, thus assuring a tight fit on each individual optical cable connection.

As illustrated in FIGS. 6 and 7 the longitudinal movement of the board housing assembly 150 is controlled by a spring assembly 182. The term spring refers to a resilient or elastic member, such as a coiled spring, a biasing clip, an elastic band, a compression foam, or other similar devices known in the art. In the present embodiment, the spring assembly 182 includes two spring clips 184 laterally spaced with respect to each other and located generally at the lateral ends of the board housing assembly 150. The spring assembly 182 serves three functions (a) to exert a forward force along the longitudinal axis on the board housing asse1 mbly 150, thus creating a spring bias between board housing assembly 150 and the board 102 that the board housing assembly 150 is mounted on; and (b) to lock the board latching features 156, thus preventing the board housing assembly 150 from inadvertently being removed from the board; and (c) to provide compensation for angular misalignment of the card.

The spring assembly 182 preferably biases the board housing assembly 150 towards the front or mating edge of the daughter card, such that the board housing assembly 150 is forced to move against the resistance of springs 184 when the board housing assembly 150 is moved by an action opposite to that of the normal force of the springs 184.

Figure 8:
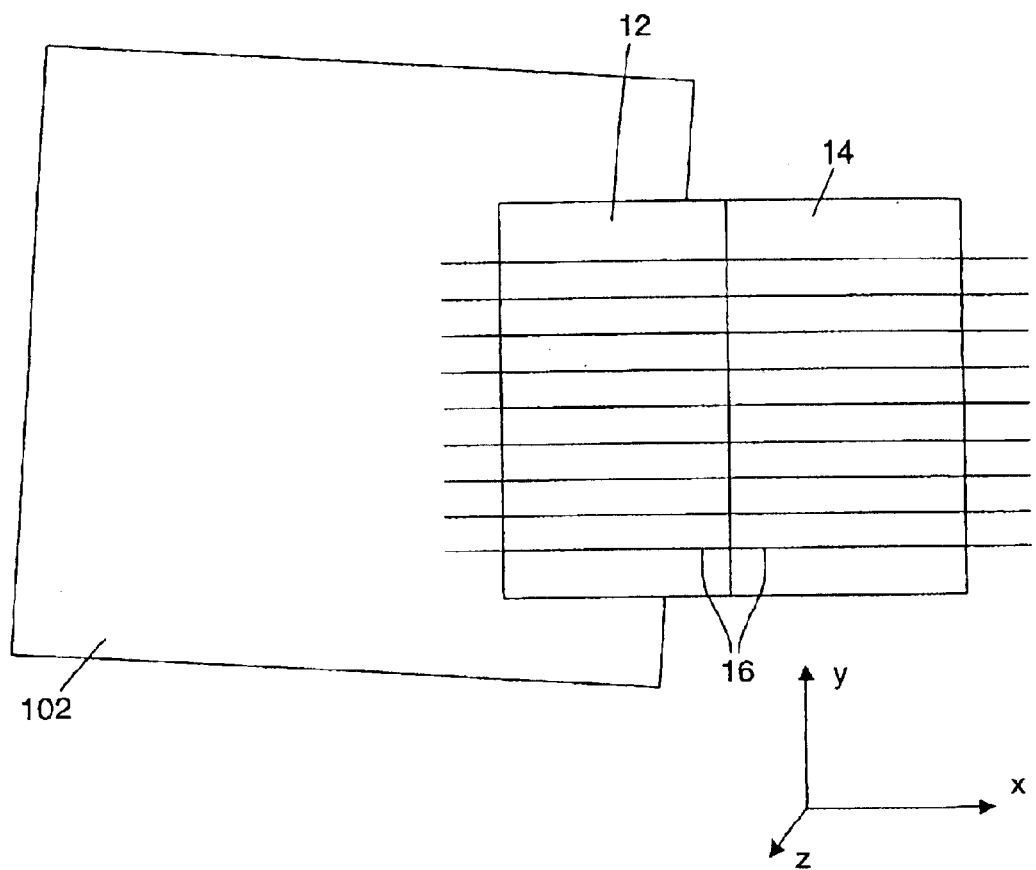
FIG. 8 is a side elevation view of a backplane connection system wherein the connector components are aligned along the axis of the interconnection even though the circuit card is angular with respect to the said axis of interconnection.

Furthermore, as illustrated in FIG. 8, the placement of the two springs 184 at laterally spaced locations allows for the correction of angular misalignments, thus reducing the pressure and possible damage on the leading edge of the backplane housing assembly 150 and compensating for angular misalignment of the port.

Figure 9:
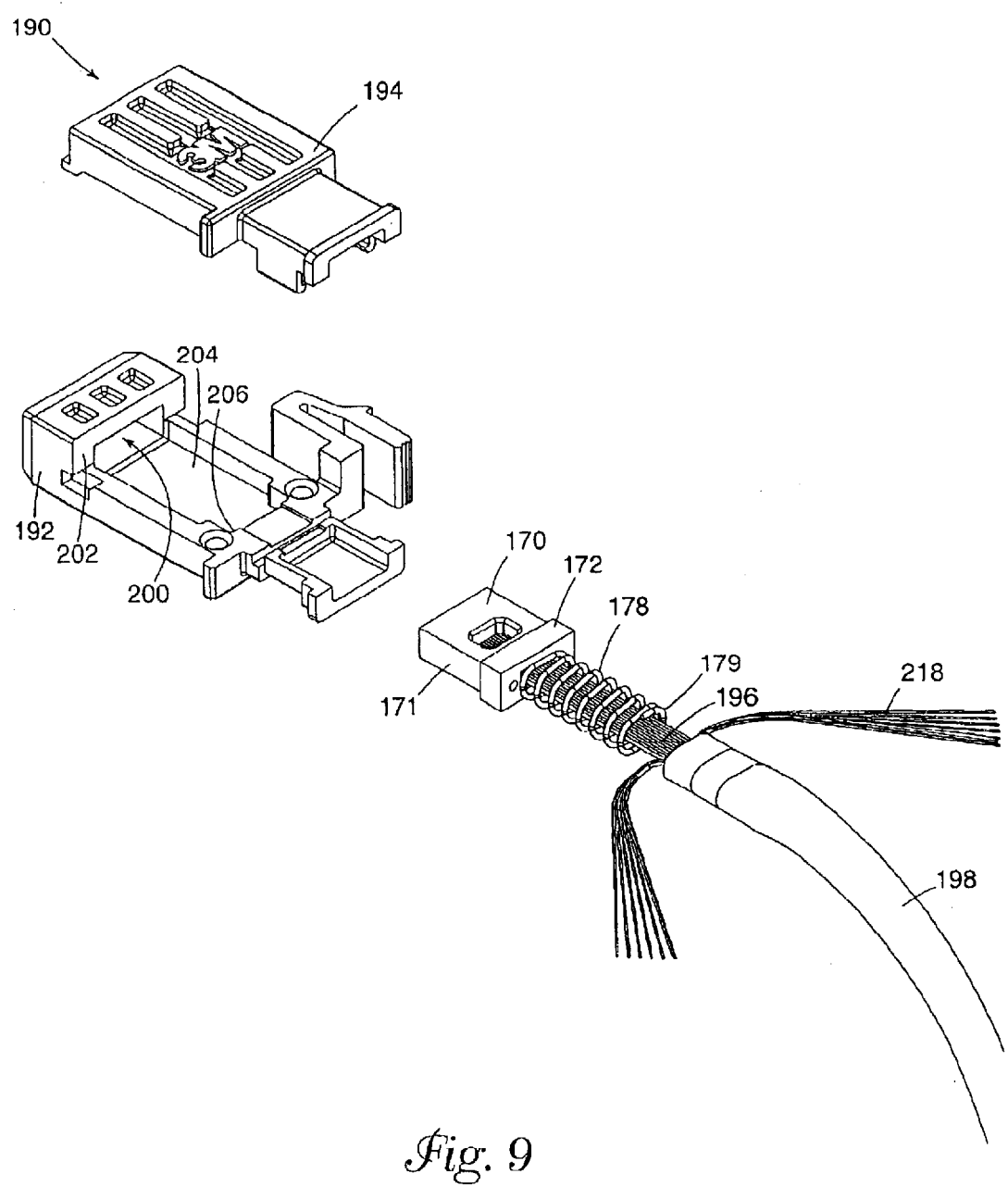
FIG. 9 is an isometric view of the plug portion of the connection system illustrated in FIG. 4.
Figure 10:
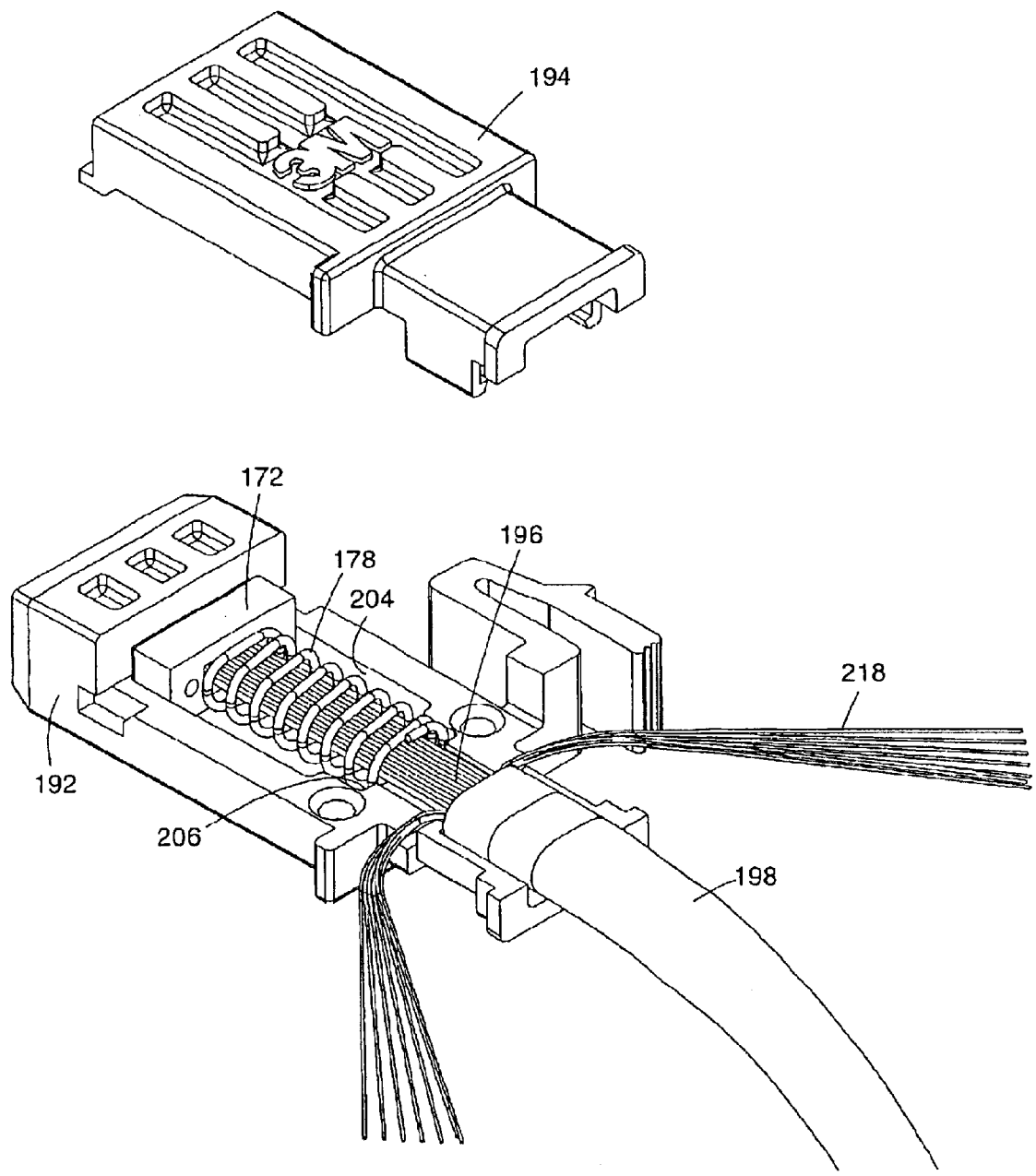
FIG. 10 is an isometric exploded view of plug illustrated in FIG. 4 showing the plug fully assembled except for the installation of the cover.
Figure 11:
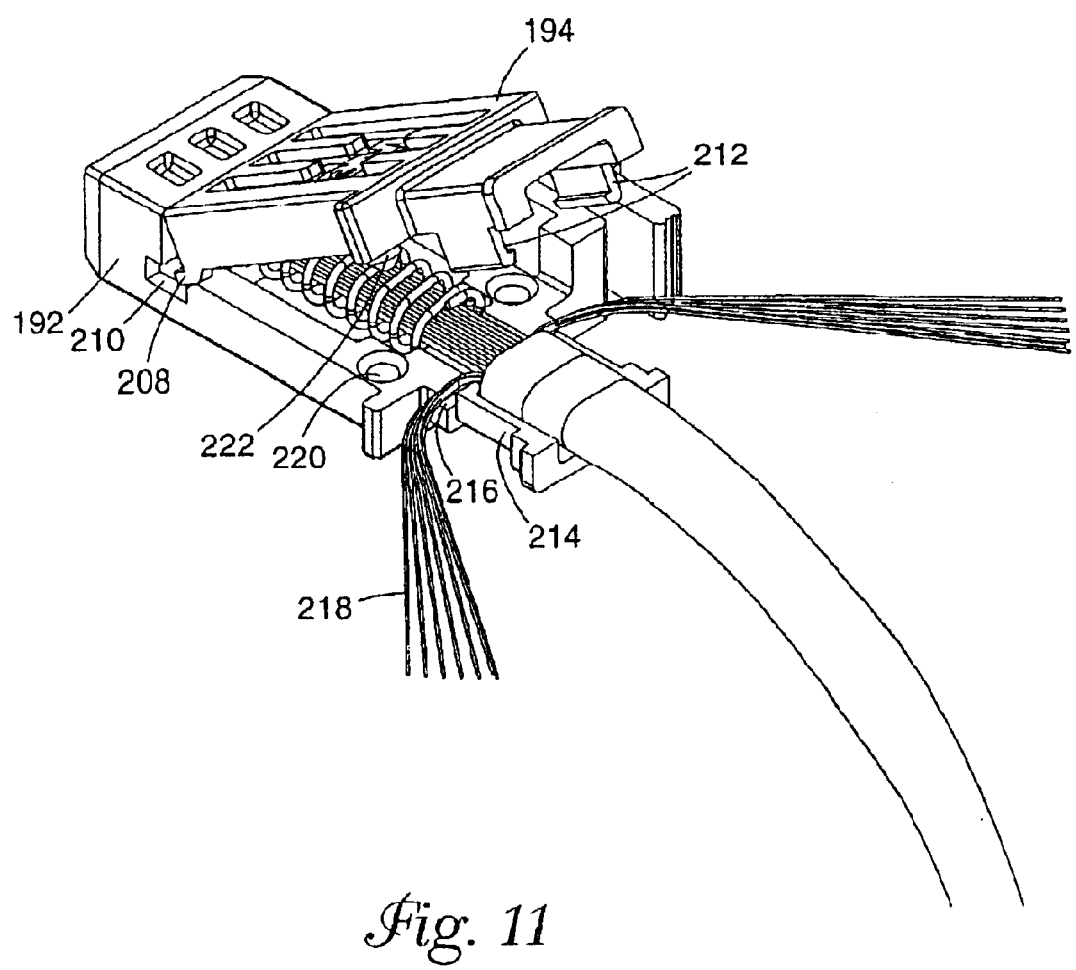
FIG. 11 is an isometric view of the plug illustrated in FIG. 4 with its cover being installed.

FIGS. 9–11 illustrate the plug assembly 190. The plug assembly 190 is designed to receive a conventional MT-style connector ferrule and provide connectorization features to match the backplane housing assembly 120. Those skilled in the art will readily appreciate that the plug assembly may be molded to receive different types of connectors. In alternative embodiments of the present invention, the backplane housing assembly may be shaped to receive directly traditional connector assemblies.

The plug assembly 190 is comprised of a lower housing member 192 and housing cover 194. As explained above, a MT style connector assembly includes a ferrule 170, and a ferrule spring 178. The MT style connector is used to terminate a multi-fiber ribbon cable 196 that is surrounded by a protective jacket 198.

The lower housing component 192 includes a front opening 200 defined by flange surfaces 202, a receiving well 204, and a spring-retaining lip 206. The ferrule 170 has a front portion 171 and a flange 172. The front portion 171 passes through opening 200. However, opening 200 is sized such that the flange 172 is too large to pass through opening 200 and the flange 172 rests against the flange surfaces 202. The end 179 of ferrule spring 178 when positioned properly within lower housing 192, as seen in FIG. 10, rests within receiving well 204 and is compressed between flange 172 and the spring-retaining lip 206. The compression of ferrule spring 178 results in a force being exerted against flange 172 and lip 206, therein spring biasing ferrule 170 forward through opening 200.

FIG. 11 illustrates housing cover 194 positioned for attachment to lower housing 192. This attachment is facilitated by placing engaging features 208 of housing cover 194 into engaging cavity 210 present in the sidewalls of the lower housing component 192. As housing cover 194 is rotated in a downward direction, engagement features 208 are trapped within engagement cavity 210. As the rotation progresses male snap latches 212 are engaged with the respective female latch receiving features 214, locking lower housing component 192 and housing cover 194 together.

An opening 216 is provided in lower housing component 192 to provide a path for strength members 218 to pass through. The strength members 218 are generally present in fiber optic cables and are typically attached to the housings of fiber optic connectors to relieve axial stress on the cable's optical fibers.

The lower housing component 192 also includes cavities 220 into which posts 222 of the housing cover 194 are inserted during the assembly procedure to provide lateral locking and alignment of the housing cover 194 to the lower housing component 192.

Figure 12:
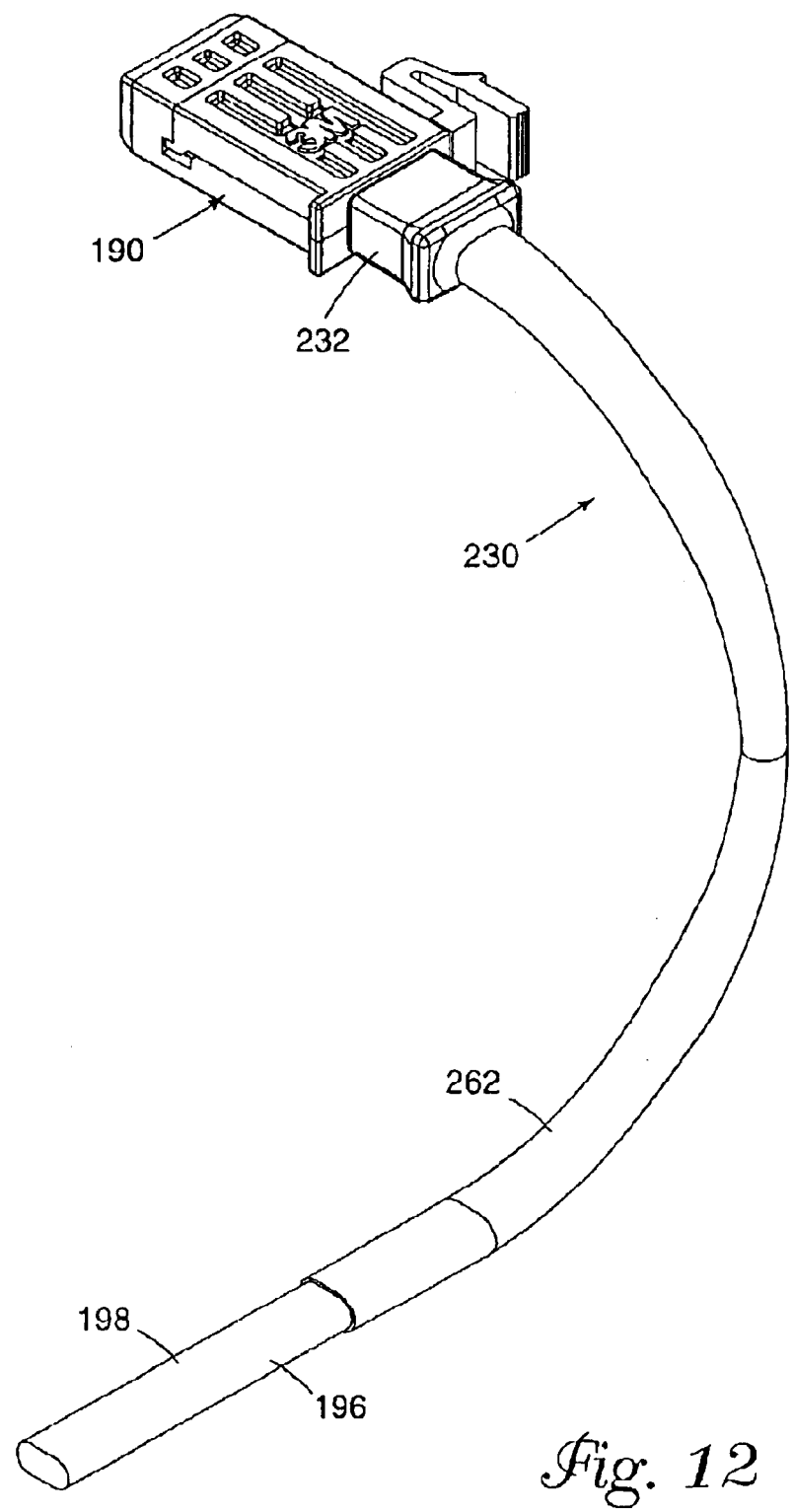
FIG. 12 is an isometric view of the plug illustrated in FIG. 4 fully assembled.

FIG. 12 illustrates plug assembly 190 assembled onto the optical fiber cable 196 with a bend radius control member 230 installed. The bend radius control member 230 for purposes of this illustration is comprised of a shrinkable tubing that has been applied over a rear housing section 232 of plug assembly 190, the cable's protective jacket 198, and the cable's strength members 218. The bend radius control member 230 is heated and shrunk into position therein securing cable 196 to the plug 190.

Figure 13:
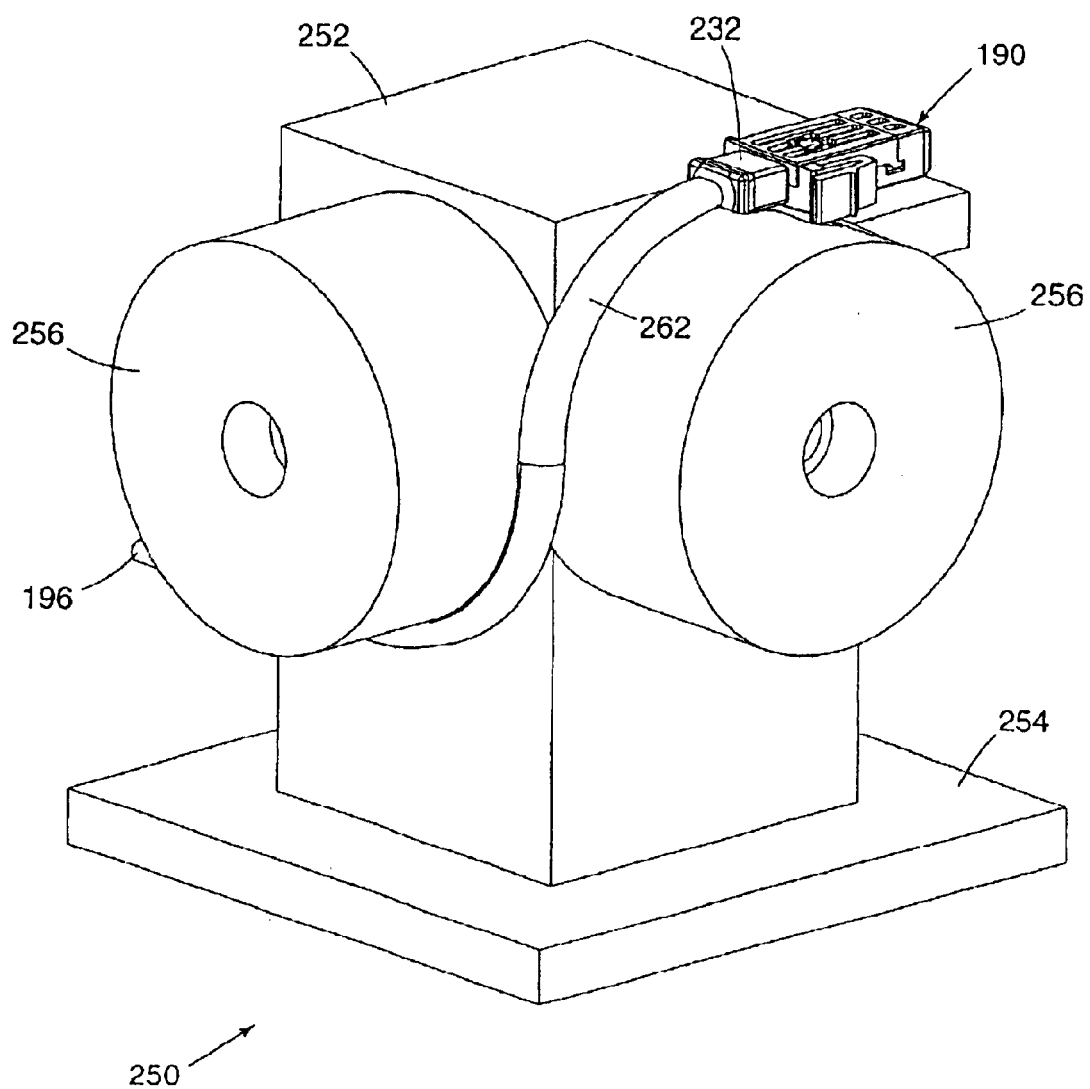
FIG. 13 is an isometric view of the plug assembly illustrated in FIG. 11 wrapped about a forming fixture.

FIG. 13 shows a cable forming device 250 comprising a vertical support 255 fastened to a base plate 254 and one or more forming mandrels 256 that are attached to vertical support 252. The radius of the mandrels 256 exceeds the critical bend radius for the optical fiber cable 196. The angles of the mandrels 256 with respect to each other correspond to the expected or desired path for the optical fibber cable 196.

To apply the bend radius control member 230, a shrinkable tubing or jacket 262 is first slid or wrapped over the plug assembly 190 and the optical fiber cable 196. The term heat-shrinkable jacket or tubing is intended to include tubing, jackets, tapes, wraps or coatings comprising heat-shrinkable materials that may be wrapped around the desired portion of the optical fiber cable. The term heat-shrinkable jacket refers to a material that, when heated, collapses and compresses around the optical fiber cable, and remains in this collapsed shape upon returning to ambient temperature, such as heat-shrinkable plastics.

The cable 196 and the shrinkable tubing 262 are wrapped about mandrels 256. The illustrated device 250 produces a dual bend wherein the cable 196 is formed down and left thus creating a compound bend. The shrinkable tubing is then heated to a temperature sufficient to cause the tubing to shrink. In the present embodiment the heat exposure required to collapse the heat-shrinkable material is selected to avoid any detrimental effects to the optical fiber cable, yet to be higher than the normal operating range for the optical fiber cable. Heat sources may include hot air guns, irradiating heat elements, heated mandrels or other suitable heat sources. The heating may be done before placing the optical cable 196 on the mandrels 256 or afterwards. The shrinkable tubing 262 and the cable 196 remain wrapped about mandrels 256 while the tubing is allowed to cool. Once cooled, the cable 196 will assume the desired shape and bend radius. The stiffness of the formed cable may be controlled by the thickness and the durometer of the material from which the shrinkable tubing is formed.

In certain instances it may be desirable to coat the inner surface of the shrinkable tubing with a heat activated adhesive that forms a bond with the protective jacket of the optical cable 196 and with the rear housing section 232. The bend radius control member may be applied to any portion of the cable where a bend is expected or desired. Field applications may be performed using a wrapable shrink material and a portable heat source, such as a heat air gun or lamp.

Figure 14:
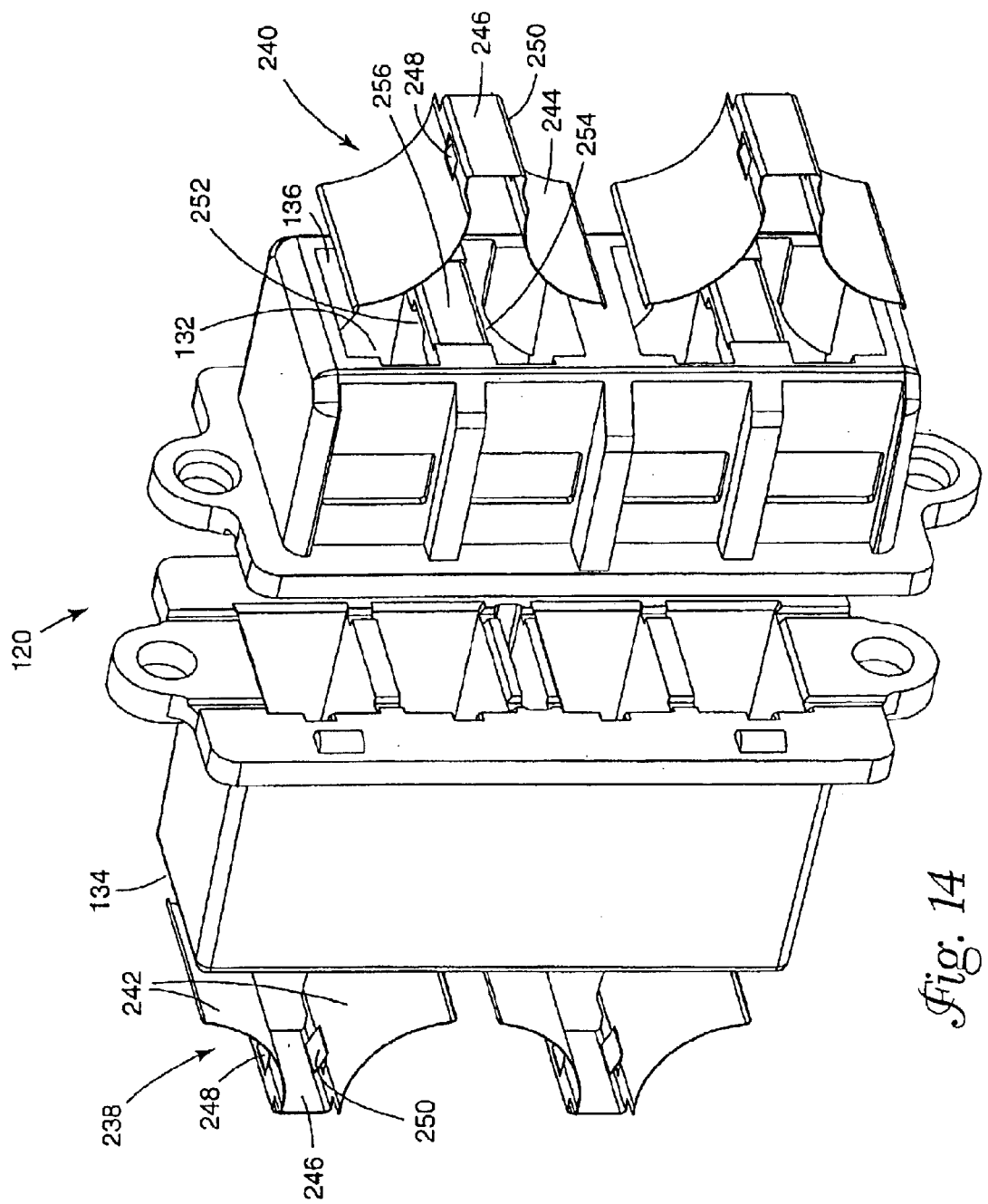
FIG. 14 is an exploded isometric view of a backplane housing assembly.

FIG. 14 shows a backplane housing assembly 120 according to the present invention including an alternative embodiment of the folding front doors 238 and folding back doors 240. In this case, the structure of the folding front doors 238 and the folding back doors 240 includes a pair of substantially equally sized biasing members 242,244 connected by an elongate hinge plate 246 located between the biasing members 242,244 and integrally formed therewith. The general appearance of each of the folding doors 238,240 is that of a V-folded planar element including a substantially centrally located hinge plate 246 having biasing members 242,244 joined at opposing longitudinal edges of the hinge plate 246 and extending outwardly of the same side of the hinge plate 246.

After installation in the housing assembly 120, the biasing members 242,244 of each of the folding doors 238,240 provide closure at either the front openings 134 or the rear openings 136 of a pair of adjacent receiving cavities 132. In the embodiment shown in FIG. 14, installation of the folding doors 238,240 requires the placing of a first latch 248 and a second latch 250 adjacent to each of the longitudinal edges of the hinge plate 246. The latches 248,250 engage an upper latch seat 252 and a lower latch seat 254 formed as recesses in the upper and lower faces of an intervening wall 256 between adjacent receiving cavities 132. With the biasing members 242,244 positioned over e.g. openings 134 of an adjacent pair of receiving cavities 132, the hinge plate 246 being aligned with the intervening wall 256 and latches 248,250 positioned to engage the latch seats 252,254, application of pressure to the hinge plate 246 attaches the folding door 240 to the housing assembly 120. This provides connection of the folding door 240 to the intervening wall 256 by interference-fit between the latches 248,250 and the latch seats 252,254. Secure attachment of the hinge plate 246 adjacent to the intervening wall restricts movement of the hinge plate 246 but allows deflection of each biasing member 242,244, independent of the other, during insertion of a plug 190 into a receiving cavity 132 or withdrawal therefrom. Fabrication of biasing members 242,244 requires the use of durable material that retains its shape for repeated cycling between a retracted condition, to allow access to a receiving cavity 132 and a closed condition in which a biasing member 242,244 fills an opening 134,136 and presents a barrier to contaminants such as dirt, dust moisture and the like. Preferably the durable material is a flexible metal, such as a stainless steel alloy, a beryllium/copper alloy or similar springy materials that return substantially to their original shape even after numerous applications of shape altering forces.

It should be noted that this invention is not limited to the use of shrinkable tubing to provide strain relief and bend radius control; however the use of shrinkable tubing offers an inexpensive solution to an otherwise costly problem.

Those skilled in the art will appreciate that the present invention may be used when coupling a variety of optical devices and even non-optical devices that require precise alignment. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed:

1. A method for controlling the bend radius of at least a portion of an optical fiber cable having at least one optical fiber, the method comprising the steps of:
   a. providing a jacket of a heat shrinkable-material;
   b. placing the jacket around the portion of the optical fiber cable;
   c. bending the portion of the optical fiber cable at a desired bend angle; and
   d. shrinking the jacket around the optical fiber cable by the application of heat causing the optical fiber cable to permanently maintain the desired bend angle.

2. The method of claim 1, wherein the step of bending includes bending the portion of the optical fiber cable in at least two curves.

3. The method of claim 2, wherein the curves are in different planes.

4. The method of claim 1, the step of bending the optical fiber cable comprising the steps of:
   providing a cable forming device having at least one mandrel, wherein the mandrel has a radius greater than a minimum bend radius for the optical fiber cable, and
   wrapping the portion of the optical fiber cable about the mandrel.

5. The method of claim 4, the cable forming device including at least two mandrels, wherein the mandrels are attached to different phases of a support, and the cable is bent in an S-shape having two curves, the two curves being on different planes.

* * * * *

UNITED STATES PATENT AND TRADEMARK OFFICE
CERTIFICATE OF CORRECTION

| | | |
|---|---|---|
| PATENT NO. | : 7,076,144 B2 | Page 1 of 1 |
| APPLICATION NO. | : 09/992212 | |
| DATED | : July 11, 2006 | |
| INVENTOR(S) | : Harry A. Loder | |

It is certified that error appears in the above-identified patent and that said Letters Patent is hereby corrected as shown below:

Title Page,
Iem [56], References Cited, under OTHER PUBLICATIONS, delete "Melchlor" and insert -- Melchior -- therefor.

Column 1,
Line 9, after "1999" insert -- , --.

Column 3,
Line 17, delete "lighttransmitting" and insert -- light-transmitting -- therefor.
Line 24, delete "(electromagnetic" and insert -- (electro-magnetic -- therefor.
Line 48, delete "preformed" and insert -- pre-formed -- therefor.

Signed and Sealed this

Twenty-sixth Day of December, 2006

JON W. DUDAS
*Director of the United States Patent and Trademark Office*